(12) United States Patent
He et al.

(10) Patent No.: US 11,949,766 B2
(45) Date of Patent: Apr. 2, 2024

(54) AUTO-NEGOTIATION METHOD AND APPARATUS

(71) Applicant: HUAWEI TECHNOLOGIES CO., LTD., Guangdong (CN)

(72) Inventors: Xiang He, Beijing (CN); Jun Hu, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 68 days.

(21) Appl. No.: 17/721,702

(22) Filed: Apr. 15, 2022

(65) Prior Publication Data

US 2022/0263600 A1     Aug. 18, 2022

Related U.S. Application Data

(63) Continuation of application No. PCT/CN2020/121109, filed on Oct. 15, 2020.

(30) Foreign Application Priority Data

Oct. 18, 2019   (CN) .......................... 201910996044.7

(51) Int. Cl.
*H04L 69/24* (2022.01)
*H04L 1/00* (2006.01)

(52) U.S. Cl.
CPC ............ *H04L 69/24* (2013.01); *H04L 1/0072* (2013.01); *H04L 1/0076* (2013.01)

(58) Field of Classification Search
CPC .................................................... H04L 69/24
See application file for complete search history.

(56) References Cited

U.S. PATENT DOCUMENTS

2013/0275804 A1* 10/2013 Lee ................. H04L 1/0014
                                                          714/15
2015/0341277 A1* 11/2015 Gravel .............. H04L 1/0041
                                                          370/468
(Continued)

FOREIGN PATENT DOCUMENTS

CN          102215067 A      10/2011
CN          103222251 A       7/2013
(Continued)

OTHER PUBLICATIONS

"IEEE Standard for Ethernet Section Five", IEEE Draft; P8023_D3P2_SECTION5, IEEE-SA, Piscataway, NJ USA, vol. 802.3cj drafts, No. D3.2, Mar. 9, 2018 (Mar. 9, 2018), pp. 1-845, XP068124716.
(Continued)

*Primary Examiner* — Joseph D Torres
(74) *Attorney, Agent, or Firm* — WOMBLE BOND DICKINSON (US) LLP

(57) ABSTRACT

An interface obtains basic page information from another interface. The basic page information includes N bits, the N bits include an FEC function indicator bit sequence including an FEC ability indicator bit and an FEC requested indicator bit. The interface determines, based on values of a plurality of bits in the N bits, an operation mode supported by the another interface. The FEC function indicator bit sequence includes a first FEC function indicator bit corresponding to m FEC abilities; or the FEC function indicator bit sequence includes a first FEC ability indicator bit corresponding to n FEC abilities, where both m and n are greater than or equal to 1. Because one FEC function indicator bit indicates more FEC abilities, N bits in a basic page can carry more information, so that a process of increasing auto-negotiation pages is slowed down, thereby avoiding impact on auto-negotiation efficiency.

20 Claims, 3 Drawing Sheets

(56) References Cited

U.S. PATENT DOCUMENTS

| | | |
|---|---|---|
| 2016/0164736 A1 | 6/2016 | Lusted et al. |
| 2017/0250858 A1 | 8/2017 | Chae et al. |
| 2017/0317785 A1 | 11/2017 | Olson et al. |
| 2019/0260504 A1* | 8/2019 | Philip .................... H04L 1/0041 |
| 2022/0103916 A1* | 3/2022 | Wang ..................... H04Q 11/00 |

FOREIGN PATENT DOCUMENTS

| | | |
|---|---|---|
| CN | 104081797 A | 10/2014 |
| WO | 2016085983 A1 | 6/2016 |

OTHER PUBLICATIONS 802.3cd-2018—IEEE Standard for Ethernet—Amendment 3: Media Access Control Parameters for 50 GB/s and Physical Layers and Management Parameters for 50 GB/s, 100 GB/s, and 200 GB/s Operation, 401 pages.

802.3cb-2018—IEEE Standard for Ethernet—Amendment 1:Physical Layer Specifications and Management Parameters for 2.5 GB/s and 5 GB/s Operation over Backplane, 206 pages.

IEEE Std 802.3-2018, IEEE Standard for Ethernet LAN/MAN Standards Committee of the, IEEE Computer Society, Approved Jun. 14, 2018, 5600 pages.

Draft Standard for Ethernet Section Five, IEEE Draft P802.3/D3.2, Mar. 13, 2018, 2 pages.

* cited by examiner

AUTO-NEGOTIATION METHOD AND APPARATUS

CROSS-REFERENCE TO RELATED APPLICATIONS

This application is a continuation application of International Patent Application No. PCT/CN2020/121109, filed on Oct. 15, 2020, which claims priority to Chinese Patent Application No. 201910996044.7, filed on Oct. 18, 2019. The disclosures of the aforementioned applications are hereby incorporated by reference in their entireties.

TECHNICAL FIELD

This application relates to the communications field, and in particular, to an auto-negotiation method and apparatus.

BACKGROUND

Ethernet interface functions increase as communications technologies develop. Different Ethernet interfaces may support different Ethernet interface functions. Different interfaces that support different Ethernet interface functions may also use different operation modes. If two interfaces use different operation modes, the two interfaces cannot communicate with each other. In view of this, an auto-negotiation mechanism emerges. Auto-negotiation means that each of two interfaces sends auto-negotiation information to a peer end, and notifies, by using the auto-negotiation information, the peer end of an operation mode supported by the interface. Each of the two interfaces analyzes auto-negotiation information coming from the peer end to determine an operation mode supported by the peer end. In this way, the two interfaces negotiate based on the operation mode supported by the interface and the operation mode supported by the peer end, to reach an agreement and communicate according to a same working mechanism.

A part of the auto-negotiation information is included in a basic page, and the basic page includes several bits. A specific meaning of some bits in the basic page is specified in a current IEEE 802.3 standard. It may be understood that many Ethernet interface functions may emerge at any time as communications technologies are constantly updated. Once a new Ethernet interface function emerges, negotiation about information related to the new Ethernet interface function is also required during auto-negotiation. However, the basic page can carry limited information, and therefore more pages need to be used for auto-negotiation. When pages increase, auto-negotiation efficiency is affected.

In view of this, an urgent solution is required to resolve the foregoing problem.

SUMMARY

Embodiments of this disclosure provide an auto-negotiation method and apparatus, to resolve a problem that auto-negotiation efficiency is affected because a basic page can carry limited information and more pages need to be used for auto-negotiation.

According to a first aspect of embodiments of this disclosure, an auto-negotiation method is provided. Specifically, a first interface may obtain basic page information from a second interface. The basic page information includes N bits. Then the first interface may determine, based on values of a plurality of bits in the N bits, an operation mode supported by the second interface. In this embodiment of this disclosure, the N bits include a forward error correction (FEC) function indicator bit sequence, and the FEC function indicator bit sequence includes an FEC ability indicator bit and an FEC requested indicator bit. Unlike the conventional technology in which each FEC function indicator bit in a basic page can correspond to one FEC ability, in this embodiment of this disclosure, a first FEC function indicator bit in the FEC function indicator bit sequence can correspond to m FEC abilities, where m is greater than or equal to 1. When m is greater than 1, technology abilities supported by the m FEC abilities are incompatible, so that during auto-negotiation, a meaning indicated by the FEC function indicator bit can be determined. Alternatively, a first FEC ability indicator bit in the FEC function indicator bit sequence corresponds to n FEC abilities, where n is greater than or equal to 1. When n is greater than 1 and technology abilities supported by the n FEC abilities are compatible, each of the n FEC abilities corresponds to one FEC requested indicator bit, and a maximum of one of the n FEC abilities is requested for use at a same moment, so that during auto-negotiation, a meaning indicated by the FEC ability indicator bit can be determined. In other words, one FEC function indicator bit in this embodiment of this disclosure indicates more FEC abilities than that in the conventional technology, so that N bits in a basic page can carry more information, to slow down a process of increasing auto-negotiation pages, so that auto-negotiation efficiency can be improved.

In an embodiment, when the first FEC function indicator bit corresponds to m FEC abilities, because the technology abilities corresponding to the m FEC abilities are incompatible, a specific meaning expressed by the first FEC function indicator bit may be determined based on a technology ability supported by the second interface. Specifically, the first interface may determine, based on a value of a first technology ability indicator bit and a value of a second technology ability indicator bit, the technology ability supported by the second interface. If the first interface determines that the second interface supports the first technology ability, it indicates that the first interface does not support the second technology ability, and therefore, there is no real sense in adding an FEC ability corresponding to the second technology ability to an auto-negotiation page. Therefore, in this case, the first interface may determine that an FEC ability indicated by the first FEC function indicator bit corresponds to the first technology ability. Therefore, the first interface may determine, based on a value of the first FEC function indicator bit, an FEC ability supported by the second interface and an FEC ability that the second interface requests to use, in other words, determine whether the second interface supports an FEC ability corresponding to the first technology ability and determine whether the second interface requests to use the FEC ability corresponding to the first technology ability.

In an embodiment, when the first FEC ability indicator bit corresponds to n FEC abilities, because the technology abilities corresponding to the n FEC abilities are compatible, in other words, the second interface may support the technology abilities corresponding to the n FEC abilities, a specific meaning expressed by the first FEC ability indicator bit may be determined based on a technology ability supported by the second interface. Specifically, the first interface may determine, based on a value of a third technology ability indicator bit and a value of a fourth technology ability indicator bit, the technology ability supported by the second interface. Then the first interface may determine, based on the technology ability supported by the second interface and a value of the first FEC ability indicator bit, the operation mode supported by the second interface.

In an embodiment, if the second interface supports the third technology ability and does not support the fourth technology ability, the first interface may determine that an FEC ability indicated by the first FEC ability indicator bit corresponds to the third technology ability, and therefore, there is no real sense in adding an FEC ability corresponding to the fourth technology ability to an auto-negotiation page. Therefore, in this case, the first interface may determine that the FEC ability indicated by the first FEC ability indicator bit corresponds to the third technology ability. Further, the first interface may determine, based on the value of the first FEC ability indicator bit, whether the second interface supports an FEC ability corresponding to the third technology ability.

In an embodiment, each of the n FEC abilities corresponds to one FEC requested indicator bit. Therefore, after determining that the FEC ability indicated by the first FEC ability indicator bit corresponds to the third technology ability, the first interface may further determine, based on a value of a first FEC requested indicator bit, an FEC ability that the second interface requests to use. The first FEC requested indicator bit is an FEC requested indicator bit corresponding to the third technology ability. Therefore, the first interface may determine the FEC ability supported by the second interface and the FEC ability that the second interface requests to use.

In an embodiment, if the first interface determines that the second interface supports the third technology ability and the fourth technology ability, the FEC ability indicated by the first FEC ability indicator bit may be an FEC ability corresponding to the third technology ability or an FEC ability corresponding to the fourth technology ability. In this case, because a maximum of one of the FEC ability corresponding to the third technology ability and the FEC ability corresponding to the fourth technology ability can be requested for use at a same moment, an FEC ability that the second interface requests to use may be first determined, so that the FEC ability indicated by the first FEC ability indicator bit is further determined. Specifically, the first interface may determine, based on values of a first FEC requested indicator bit and a second FEC requested indicator bit, the FEC ability that the second interface requests to use. The first FEC requested indicator bit corresponds to the third technology ability. The value of the first FEC requested indicator bit may be used to determine whether the second interface requests to use the FEC ability corresponding to the third technology ability. The second FEC requested indicator bit corresponds to the fourth technology ability. The value of the second FEC requested indicator bit may be used to determine whether the second interface requests to use the FEC ability corresponding to the fourth technology ability. If the first interface determines that the FEC ability that the second interface requests to use is the FEC ability corresponding to the third technology ability, there is no real sense in adding the FEC ability corresponding to the fourth technology ability to an auto-negotiation page. Therefore, the first interface may determine that the FEC ability indicated by the first FEC ability indicator bit corresponds to the third technology ability. Further, because the second interface requests to use the FEC ability corresponding to the third technology ability, normally, the second interface certainly supports the FEC ability corresponding to the third technology ability, in other words, the first interface may determine that the second interface supports the FEC ability corresponding to the third technology ability.

In an embodiment, a value of N may be equal to a quantity of bits of a basic page in a current IEEE 802.3 standard, in other words, N is equal to 48. Correspondingly, in the current IEEE 802.3 standard, the $22^{nd}$ bit to the $37^{th}$ bit in the 48 bits are technology ability indicator bits, and specific meanings of the $22^{nd}$ bit to the $37^{th}$ bit are clearly specified. The $45^{th}$ bit to the $48^{th}$ bit in the 48 bits are FEC function indicator bits, and specific meanings of the $45^{th}$ bit to the $48^{th}$ bit are clearly specified. Meanings of the $38^{th}$ bit to the $44^{th}$ bit in the 48 bits are not specified currently. Because the meanings of the $38^{th}$ bit to the $44^{th}$ bit are not determined, the $38^{th}$ bit to the $44^{th}$ bit may be used as FEC function indicator bits, or may be used as technology ability indicator bits. Therefore, in this embodiment of this disclosure, a technology ability indicator bit sequence may be p bits in the $22^{nd}$ bit to the $44^{th}$ bit in the 48 bits, the FEC function indicator bit sequence is q bits in the $38^{th}$ bit to the $48^{th}$ bit in the 48 bits, and the p bits are different from the q bits. In this way, 48 bits in a basic page can carry more information, so that a process of increasing auto-negotiation pages is slowed down, thereby avoiding impact on auto-negotiation efficiency.

According to a second aspect, an embodiment of this disclosure provides an auto-negotiation apparatus. The apparatus includes: an obtaining unit, configured to obtain basic page information from a second interface, where the basic page information includes N bits, the N bits include a forward error correction FEC function indicator bit sequence, the FEC function indicator bit sequence includes an FEC ability indicator bit and an FEC requested indicator bit, and N is a positive integer greater than or equal to 2; and a determining unit, configured to determine, based on values of a plurality of bits in the N bits, an operation mode supported by the second interface. The FEC function indicator bit sequence includes a first FEC function indicator bit, the first FEC function indicator bit is used to correspond to m FEC abilities, and m is greater than or equal to 1; and when m is greater than 1, technology abilities supported by the m FEC abilities are incompatible. Alternatively, the FEC function indicator bit sequence includes a first FEC ability indicator bit, the first FEC ability indicator bit corresponds to n FEC abilities, and n is greater than or equal to 1; and when n is greater than 1 and technology abilities supported by the n FEC abilities are compatible, each of the n FEC abilities corresponds to one FEC requested indicator bit, and a maximum of one of the n FEC abilities is requested for use at a same moment.

In an embodiment, the N bits further include a technology ability indicator bit sequence, and if the first FEC function indicator bit corresponds to m FEC abilities, the determining unit is configured to: determine, based on a value of a first technology ability indicator bit and a value of a second technology ability indicator bit, a technology ability supported by the second interface, where the technology abilities supported by the m FEC abilities include a first technology ability and a second technology ability; and if it is determined that the second interface supports the first technology ability, determine, based on a value of the first FEC function indicator bit, an FEC ability supported by the second interface and an FEC ability that the second interface requests to use, where the FEC ability supported by the second interface and the FEC ability that the second interface requests to use correspond to the first technology ability.

In an embodiment, if the first FEC ability indicator bit corresponds to n FEC abilities, the determining unit includes: a first determining subunit, configured to determine, based on a value of a third technology ability indicator bit and a value of a fourth technology ability indicator bit, a technology ability supported by the second interface, where the technology abilities supported by the n FEC abilities include a third technology ability and a fourth technology ability; and a second determining subunit, configured to determine, based on the technology ability supported by the second interface and a value of the first FEC ability indicator bit, the operation mode supported by the second interface.

In an embodiment, the second determining subunit is configured to: if it is determined that the second interface supports the third technology ability and does not support the fourth technology ability, determine, based on the value of the first FEC ability indicator bit, an FEC ability supported by the second interface, where the FEC ability supported by the second interface corresponds to the third technology ability.

In an embodiment, the second determining subunit is further configured to determine, based on a value of a first FEC requested indicator bit, an FEC ability that the second interface requests to use, where the first FEC requested indicator bit and the FEC ability that the second interface requests to use correspond to the third technology ability.

In an embodiment, the second determining subunit is configured to: if it is determined that the second interface supports the third technology ability and the fourth technology ability, determine, based on values of a first FEC requested indicator bit and a second FEC requested indicator bit, an FEC ability that the second interface requests to use, where the first FEC requested indicator bit corresponds to the third technology ability, and the second FEC requested indicator bit corresponds to the fourth technology ability; and if it is determined that the FEC ability that the second interface requests to use is an FEC ability corresponding to the third technology ability, determine, based on the value of the first FEC ability indicator bit, an FEC ability supported by the second interface, where the FEC ability supported by the second interface corresponds to the third technology ability.

In an embodiment, N is equal to 48, the technology ability indicator bit sequence is p bits in the $22^{nd}$ bit to the $44^{th}$ bit in the 48 bits, the FEC function indicator bit sequence is q bits in the $38^{th}$ bit to the $48^{th}$ bit in the 48 bits, and the p bits are different from the q bits.

According to a third aspect, an embodiment of this disclosure provides an auto-negotiation apparatus, including a processor and a memory. The memory is configured to store a program, and the processor is configured to execute the program in the memory to perform the method according to any implementation of the first aspect.

In an embodiment, the auto-negotiation apparatus is an interface.

In an embodiment, the interface is located on an Ethernet interface or a relay chip.

In an embodiment, the Ethernet interface is located on a switch, a router, a server, a storage device, or a personal computer.

In an embodiment, the relay chip is located on a server, a storage device, or a network device.

According to a fourth aspect, an embodiment of this disclosure provides a computer-readable storage medium, including a program. When the program is run on a computer, the computer is enabled to perform the method according to any implementation of the first aspect.

According to a fifth aspect, an embodiment of this disclosure provides a computer program product including a program. When the program is run on a computer, the computer is enabled to perform the method according to any implementation of the first aspect.

BRIEF DESCRIPTION OF DRAWINGS

To describe the technical solutions in embodiments of this disclosure or in the conventional technology more clearly, the following briefly describes the accompanying drawings used in describing embodiments or the conventional technology. It is clear that the accompanying drawings in the following descriptions show some embodiments of this disclosure, and persons of ordinary skill in the art may still derive other drawings from these accompanying drawings without creative efforts.

DESCRIPTION OF EMBODIMENTS

Embodiments of this disclosure provide an auto-negotiation method, to resolve a problem that auto-negotiation efficiency is affected because a basic page can carry limited information and more pages need to be used for auto-negotiation.

For ease of understanding, information related to an auto-negotiation basic page is first briefly described.

In a current latest IEEE 802.3 standard, an auto-negotiation basic page includes 48 bits. In addition, specific meanings of most of the 48 bits are specified in the IEEE 802.3 standard, and meanings of 7 bits from the $38^{th}$ bit to the $44^{th}$ bit are not specified currently. When the IEEE 802.3 standard specifies a meaning of each bit in the basic page, 1 bit can indicate one meaning.

It may be understood that communications technologies constantly develop, and once a new Ethernet interface function emerges, negotiation about information related to the new Ethernet interface function is also required during auto-negotiation. In the current manner in which 1 bit indicates one meaning, the 48 bits can carry limited information. If a new Ethernet interface function emerges, more pages may need to be used for auto-negotiation, for example, a next page needs to be enabled for auto-negotiation. In an auto-negotiation process, two interfaces need to interact a plurality of times for each page. Once pages increase, a quantity of times the two interfaces interact increases, affecting auto-negotiation efficiency.

The information related to the Ethernet interface function includes but is not limited to any one or a combination of an Ethernet interface type supported by an Ethernet interface and an FEC function corresponding to the Ethernet interface type. The Ethernet interface type may include two parameters named a transmission rate and a transmission medium that are supported by the Ethernet interface.

In view of this, embodiments of this disclosure provide an auto-negotiation method, to resolve the foregoing problem. The following describes the auto-negotiation method with reference to the accompanying drawings.

Figure 1:
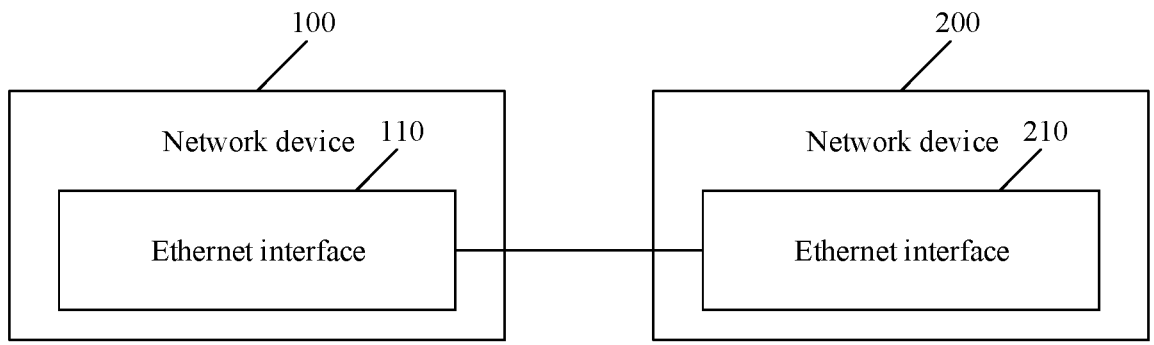
FIG. 1 is a schematic diagram of an application scenario according to an embodiment of this disclosure.

FIG. 1 is a schematic diagram of an example application scenario according to an embodiment of this disclosure. In a scenario shown in FIG. 1, a network device 100 expects to communicate with a network device 200. Specifically, the network device 100 has an Ethernet interface 110, and the network device 200 has an Ethernet interface 210. The network device 100 expects to communicate with the Ethernet interface 210 on the network device 200 by using the Ethernet interface 110. Before the Ethernet interface 110 communicates with the Ethernet interface 210, the Ethernet interface 110 needs to perform auto-negotiation with the Ethernet interface 210. The network device 100 mentioned herein may be a router or a switch. Correspondingly, the network device 200 may be a router or a switch.

It should be noted that FIG. 1 is merely shown for ease of understanding, and does not constitute a limitation on embodiments of this disclosure. In an actual application, the Ethernet interface 110 may be alternatively an Ethernet interface on a personal computer, a storage device, or a server, and correspondingly, the Ethernet interface 210 may be alternatively an Ethernet interface on a personal computer, a storage device, or a server. The storage device mentioned in embodiments of this disclosure includes but is not limited to various memories and storage arrays.

In addition, the auto-negotiation method provided in embodiments of this disclosure is not limited to auto-negotiation between two Ethernet interfaces. Considering that some relay chips also have an auto-negotiation function in an actual application, the auto-negotiation method provided in embodiment of this disclosure may be auto-negotiation between an Ethernet interface and a relay chip, or may be auto-negotiation between relay chips. The relay chip may be located on a server, a storage device, or a network device. This is not specifically limited in embodiments of this disclosure. A specific model of the relay chip is not specifically limited in embodiments of this disclosure, either.

Figure 2:
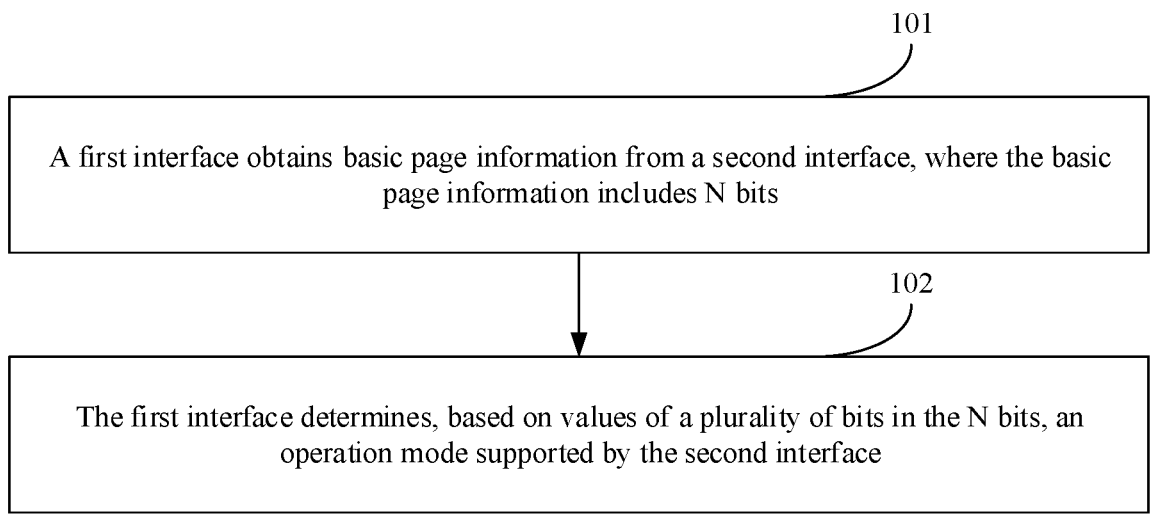
FIG. 2 is a schematic flowchart of an auto-negotiation method according to an embodiment of this disclosure.

With reference to FIG. 2, the following describes the auto-negotiation method provided in embodiments of this disclosure.

FIG. 2 is a schematic flowchart of an auto-negotiation method according to an embodiment of this disclosure. For example, the auto-negotiation method provided in this embodiment of this disclosure may be implemented by using operation 101 and operation 102.

Operation 101: A first interface obtains basic page information from a second interface, where the basic page information includes N bits.

With respect to the first interface and the second interface, it should be noted that for auto-negotiation between two Ethernet interfaces, both the first interface and the second interface may be located on Ethernet interfaces. For example, in a scenario shown in FIG. 1, the first interface may be located on the Ethernet interface 110 shown in FIG. 1, and the second interface may be located on the Ethernet interface 210 shown in FIG. 1, or the first interface is the Ethernet interface 110 shown in FIG. 1, and the second interface is the Ethernet interface 210 shown in FIG. 1. For auto-negotiation between a relay chip and an Ethernet interface, the first interface may be located on a relay chip, in other words, the first interface is an interface of the relay chip for interacting with the outside. Correspondingly, the second interface may be located on an Ethernet interface. Alternatively, the first interface is located on an Ethernet interface, and the second interface is located on a relay chip. For auto-negotiation between relay chips, both the first interface and the second interface may be located on relay chips. A specific model of the relay chip is not specifically limited in embodiments of this disclosure.

The first interface may receive the basic page information from the second interface. Specifically, the second interface may send an electrical signal that uses differential Manchester encoding (DME) to the first interface, and the first interface parses the electrical signal to obtain the basic page information. In this embodiment of this disclosure, the basic page information may include N bits, and N is a positive integer greater than or equal to 2. A specific value of N is not specifically limited in embodiments of this disclosure, and the value of N may be, for example, 48 in a current IEEE 802.3 standard, or may be another value. Examples are not enumerated herein for description.

In this embodiment of this disclosure, the N bits may include an FEC function indicator bit sequence, the FEC function indicator bit sequence is used to indicate information related to an FEC function, and the FEC function indicator bit sequence may include a plurality of bits. The FEC function indicator bit sequence may include an FEC ability indicator bit and an FEC requested indicator bit. The FEC ability indicator bit indicates whether there is a corresponding FEC ability. The FEC requested indicator bit indicates whether a corresponding FEC ability is requested for use. In this embodiment of this disclosure, there may be one or more FEC ability indicator bits, and this is not specifically limited in embodiments of this disclosure. Similarly, there may be one or more FEC requested indicator bits.

In an actual application, some technology abilities are incompatible. The technology ability may be understood as an Ethernet interface type. As described above, the Ethernet interface type may include two parameters named a transmission rate and a transmission medium that are supported by an Ethernet interface. For m incompatible technology abilities, the second interface supports a maximum of one of the m technology abilities at a same moment. In this case, in this embodiment of this disclosure, if FEC abilities corresponding to the m technology abilities need to be carried in a basic page, one FEC function indicator bit such as a first FEC function indicator bit may be used to indicate the FEC abilities corresponding to the m technology abilities. In other words, in this embodiment of this disclosure, the first FEC function indicator bit may be used to correspond to m FEC abilities, where m may be greater than or equal to 1. When m is greater than 1, technology abilities supported by the m FEC abilities are incompatible.

It should be noted that, in this embodiment of this disclosure, an FEC ability corresponding to a technology ability means that the FEC ability can support the technology ability, and correspondingly, a technology ability corresponding to an FEC ability means that the FEC ability can support the technology ability. In addition, technology abilities mentioned in embodiments of this disclosure, for example, a first technology ability, a second technology ability, a third technology ability, and a fourth technology ability mentioned below, may be existing technology abilities, or may be technology abilities that may emerge in the future. Correspondingly, an FEC ability mentioned in embodiments of this disclosure, for example, a first FEC ability mentioned below, may be an existing FEC ability, or may be an FEC ability that may emerge in the future.

It should be noted that the FEC function indicator bit includes the FEC ability indicator bit and the FEC requested indicator bit, and in an actual application, for some FEC abilities, corresponding FEC ability indicator bits and FEC requested indicator bits may be required during auto-negotiation. For example, for a technology ability, both a default FEC ability and a target FEC ability can support the technology ability, and in this case, a corresponding FEC ability indicator bit and FEC requested indicator bit are required for the target FEC ability. For some FEC abilities, only an FEC requested indicator bit may be required during auto-negotiation. For example, for a technology ability, only a target FEC ability can support the technology ability, and in this case, a corresponding FEC requested indicator bit is required for the target FEC ability. Therefore, that one FEC function indicator bit corresponds to m FEC abilities mentioned herein means that an FEC ability indicator bit (for example, a first FEC ability indicator bit) in an FEC ability indicator bit sequence corresponds to m FEC abilities, and an FEC requested indicator bit (for example, a first FEC requested indicator bit) in an FEC requested indicator bit sequence corresponds to k FEC abilities, where a value of k is less than or equal to m.

It may be understood that, because the m technology abilities are incompatible, the second interface can support only one of the m technology abilities at a same moment. When a technology ability supported by the second interface is determined, a specific meaning represented by the one FEC function indicator bit is determined, in other words, an FEC ability corresponding to the one FEC function indicator bit corresponds to the technology ability in the m technology abilities that is supported by the second interface. In this way, one FEC function indicator bit can indicate a plurality of meanings, and the plurality of meanings can also be correctly parsed, so that the basic page can carry more information.

In addition, in an actual application, although some technology abilities are compatible, a maximum of one of FEC abilities corresponding to these technology abilities is requested for use at a same moment. In this case, in this embodiment of this disclosure, for n compatible technology abilities, if FEC abilities corresponding to the n technology abilities need to be carried in the basic page, one FEC ability indicator bit may be used to indicate the FEC abilities corresponding to the n technology abilities, that is, one FEC ability indicator bit such as a first FEC ability indicator bit is used to indicate n FEC abilities. In an auto-negotiation process, to determine, from the n FEC abilities represented by the one FEC ability indicator bit, a specific meaning represented by the FEC ability indicator bit, in this embodiment of this disclosure, each of the n FEC abilities corresponds to one FEC requested indicator bit. It may be understood that, because a maximum of one of the n FEC abilities is requested for use at a same moment, the meaning of the one FEC ability indicator bit may be determined by using FEC requested indicator bits corresponding to the n FEC abilities. In other words, the first FEC ability indicator bit may correspond to n FEC abilities, and n is greater than or equal to 1. When n is greater than 1 and technology abilities supported by the n FEC abilities are compatible, each of the n FEC abilities corresponds to one FEC requested indicator bit, and a maximum of one of the n FEC abilities is requested for use at a same moment. In this way, one FEC ability indicator bit can indicate a plurality of meanings, and the plurality of meanings can also be correctly parsed, so that the basic page can carry more information.

Operation 102: The first interface determines, based on values of a plurality of bits in the N bits, an operation mode supported by the second interface.

After obtaining the basic page information, the first interface may determine, based on the values of the plurality of bits in the N bits, the operation mode supported by the second interface. Specifically, there are two cases for a value of 1 bit. In one case, the value of the bit is 0, and in the other case, the value of the bit is 1. The first interface may determine, based on meanings of the plurality of bits and the values of the plurality of bits, the operation mode supported by the second interface. The operation mode that is supported by the second interface and that is mentioned herein includes but is not limited to an Ethernet interface type supported by the second interface, an FEC ability supported by the second interface, an FEC ability that the second interface requests to use, and the like.

After determining the operation mode supported by the second interface, the first interface may determine, based on an operation mode supported by the first interface, an operation mode supported by both the first interface and the second interface, and communicate with the second interface based on the operation mode supported by both the first interface and the second interface.

As described above, in this embodiment of this disclosure, an FEC function indicator bit (for example, the first FEC function indicator bit) in the FEC function indicator bit sequence may correspond to m FEC abilities; or an FEC ability indicator bit (for example, the first FEC ability indicator bit) in the FEC ability indicator bit sequence may correspond to n FEC abilities. The following separately describes implementations of operation 102 when the first FEC function indicator bit corresponds to m FEC abilities and the first FEC ability indicator bit corresponds to n FEC abilities.

A specific implementation of operation 102 when the first FEC function indicator bit corresponds to m FEC abilities is first described.

Figure 3:
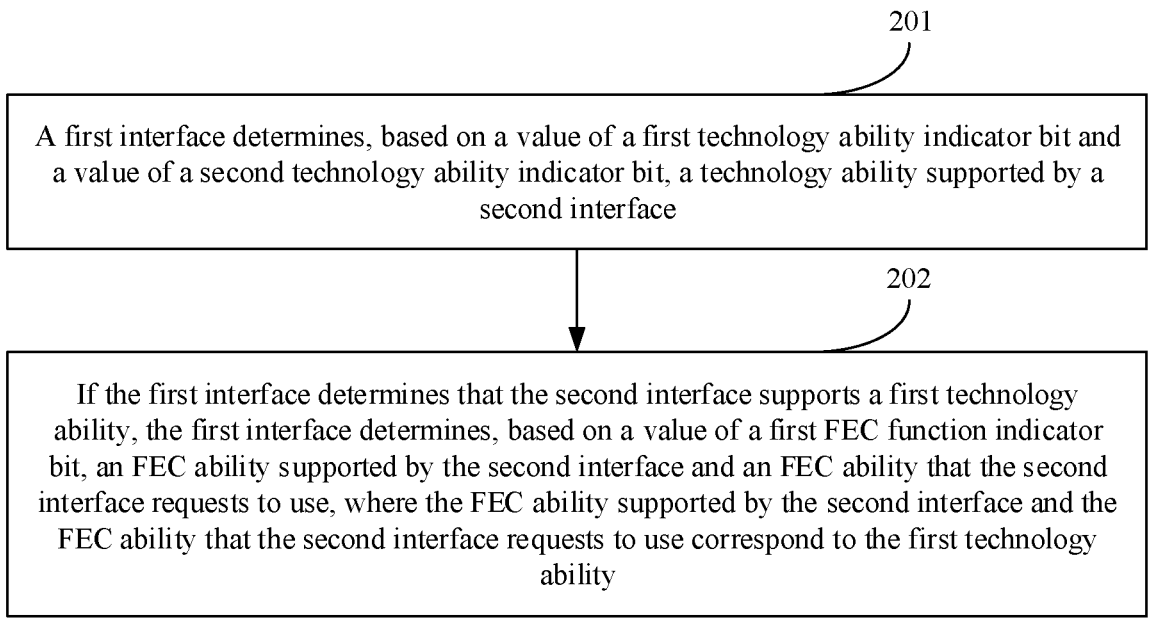
FIG. 3 is a flowchart of a method for determining an operation mode supported by a second interface according to an embodiment of this disclosure.

FIG. 3 is a flowchart of a method for determining an operation mode supported by a second interface according to an embodiment of this disclosure. The method shown in FIG. 3 may be implemented, for example, in operation 201 and operation 202.

Operation 201: A first interface determines, based on a value of a first technology ability indicator bit and a value of a second technology ability indicator bit, a technology ability supported by a second interface.

As described above, assuming that technology abilities corresponding to the m FEC abilities are incompatible, a specific meaning expressed by the first FEC function indicator bit may be determined based on the technology ability supported by the second interface. In this embodiment of this disclosure, the foregoing N bits may further include a technology ability indicator bit sequence. The technology ability indicator bit sequence may include a plurality of technology ability indicator bits, and each technology ability indicator bit may have a corresponding technology ability. For example, the first technology ability indicator bit corresponds to a first technology ability. For the first technology ability indicator bit, the value of the first technology ability indicator bit may indicate whether an Ethernet interface supports the first technology ability. In other words, the first interface may determine, based on values of some or all bits in the technology ability indicator bit sequence, the technology ability supported by the second interface, to further determine the specific meaning expressed by the first FEC function indicator bit.

In this embodiment of this disclosure, the technology abilities supported by the m FEC abilities include the first technology ability and the second technology ability. The value of the first technology ability indicator bit is used to indicate whether the second interface supports the first technology ability, and the value of the second technology ability indicator bit is used to indicate whether the second interface supports the second technology ability. The first interface may determine, based on the value of the first technology ability indicator bit and the value of the second technology ability indicator bit, the technology ability supported by the second interface.

Operation 202: If the first interface determines that the second interface supports the first technology ability, the first interface determines, based on a value of the first FEC function indicator bit, an FEC ability supported by the second interface and an FEC ability that the second interface requests to use, where the FEC ability supported by the second interface and the FEC ability that the second interface requests to use correspond to the first technology ability.

It may be understood that, if the first interface determines that the second interface supports the first technology ability, it indicates that the first interface does not support the second technology ability, and therefore, there is no real sense in adding an FEC ability corresponding to the second technology ability to an auto-negotiation page. Therefore, in this case, the first interface may determine that an FEC ability indicated by the first FEC function indicator bit corresponds to the first technology ability. Therefore, the first interface may determine, based on the value of the first FEC function indicator bit, the FEC ability supported by the second interface and the FEC ability that the second interface requests to use, in other words, determine whether the second interface supports an FEC ability corresponding to the first technology ability and determine whether the second interface requests to use the FEC ability corresponding to the first technology ability.

Operation 202 is described by using an example. For example, the FEC ability corresponding to the first technology ability is a first FEC ability and a default FEC ability. Therefore, the first FEC ability has a corresponding FEC ability indicator bit and FEC requested indicator bit. If the first FEC ability is disabled by default, a value of the FEC ability indicator bit corresponding to the first FEC ability is 1, and a value of the FEC requested indicator bit corresponding to the first FEC ability is 1, the first interface may determine that the second interface supports the first technology ability, supports the first FEC ability, and requests to use the first FEC ability. For another example, the FEC ability corresponding to the first technology ability is a first FEC ability and a default FEC ability. If the first FEC ability is disabled by default, a value of an FEC ability indicator bit corresponding to the first FEC ability is 1, and a value of an FEC requested indicator bit corresponding to the first FEC ability is 0, the first interface may determine that the second interface supports the first technology ability, supports the first FEC ability, and requests to use the default FEC ability.

Next, a specific implementation of operation 102 when the first FEC ability indicator bit corresponds to n FEC abilities is described.

Figure 4:
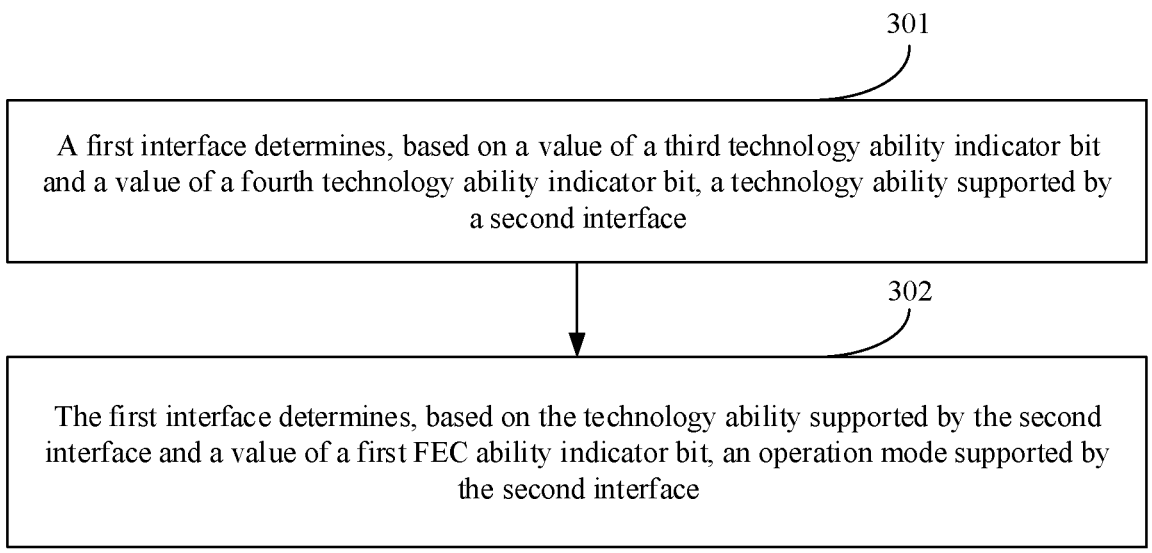
FIG. 4 is a flowchart of another method for determining an operation mode supported by a second interface according to an embodiment of this disclosure.

FIG. 4 is a flowchart of another method for determining an operation mode supported by a second interface according to an embodiment of this disclosure. The method shown in FIG. 4 may be implemented by using, for example, operation 301 and operation 302.

Operation 301: A first interface determines, based on a value of a third technology ability indicator bit and a value of a fourth technology ability indicator bit, a technology ability supported by a second interface.

As described above, technology abilities corresponding to the n FEC abilities are compatible. In other words, the second interface may support the technology abilities corresponding to the n FEC abilities. Therefore, a specific meaning expressed by the first FEC ability indicator bit may be determined based on the technology ability supported by the second interface.

In this embodiment of this disclosure, the technology abilities supported by the n FEC abilities include the third technology ability and the fourth technology ability. The value of the third technology ability indicator bit is used to indicate whether the second interface supports the third technology ability, and the value of the fourth technology ability indicator bit is used to indicate whether the second interface supports the fourth technology ability. The first interface may determine, based on the value of the third technology ability indicator bit and the value of the fourth technology ability indicator bit, the technology ability supported by the second interface.

Operation 302: The first interface determines, based on the technology ability supported by the second interface and a value of the first FEC ability indicator bit, an operation mode supported by the second interface.

After determining the technology ability supported by the second interface, the first interface may determine, based on the technology ability supported by the second interface and the value of the first FEC ability indicator bit, the operation mode supported by the second interface. In this embodiment of this disclosure, because the technology abilities corresponding to the n FEC abilities are compatible, the second interface may support both the third technology ability and the fourth technology ability, or the second interface may support one of the third technology ability and the fourth technology ability. A specific implementation of operation 302 varies with the technology ability supported by the second interface. In other words, operation 302 may include at least two cases during specific implementation. The following separately describes the specific implementation of operation 302 for the two cases.

Case 1: The first interface determines that the second interface supports the third technology ability and does not support the fourth technology ability.

In this embodiment of this disclosure, if the second interface supports the third technology ability and does not support the fourth technology ability, the first interface may determine that an FEC ability indicated by the first FEC ability indicator bit corresponds to the third technology ability, and therefore, there is no real sense in adding an FEC ability corresponding to the fourth technology ability to an auto-negotiation page. Therefore, in this case, the first interface may determine that the FEC ability indicated by the first FEC ability indicator bit corresponds to the third technology ability. Further, the first interface may determine, based on the value of the first FEC ability indicator bit, whether the second interface supports an FEC ability corresponding to the third technology ability. For example, if the FEC ability corresponding to the third technology ability is a third FEC ability, and the value of the first FEC ability indicator bit is 0, it indicates that the second interface does not support the third FEC ability. For another example, if the FEC ability corresponding to the third technology ability is a third FEC ability, and the value of the first FEC ability indicator bit is 1, it indicates that the second interface supports the third FEC ability.

As described above, each of the n FEC abilities corresponds to one FEC requested indicator bit. In this embodiment of this disclosure, after determining that the FEC ability indicated by the first FEC ability indicator bit corresponds to the third technology ability, the first interface may further determine, based on the value of the first FEC requested indicator bit, an FEC ability that the second interface requests to use. The first FEC requested indicator bit is an FEC requested indicator bit corresponding to the third technology ability. Therefore, the first interface may determine the FEC ability supported by the second interface and the FEC ability that the second interface requests to use. For example, if the FEC ability corresponding to the third technology ability is a third FEC ability, the value of the first FEC ability indicator bit is 1, and the value of the first FEC requested indicator bit is 1, it indicates that the second interface supports the third FEC ability and requests to use the third FEC ability. For another example, if the FEC ability corresponding to the third technology ability is a third FEC ability, the value of the first FEC ability indicator bit is 1, and the value of the first FEC requested indicator bit is 0, it indicates that the second interface supports the third FEC ability and does not request to use the third FEC ability.

Case 2: The first interface determines that the second interface supports the third technology ability and the fourth technology ability.

It may be understood that, because the second interface supports both the third technology ability and the fourth technology ability, an FEC ability indicated by the first FEC ability indicator bit may be an FEC ability corresponding to the third technology ability, or may be an FEC ability corresponding to the fourth technology ability. In this case, because a maximum of one of the FEC ability corresponding to the third technology ability and the FEC ability corresponding to the fourth technology ability can be requested for use at a same moment, in this embodiment of this disclosure, an FEC ability that the second interface requests to use may be first determined, so that the FEC ability indicated by the first FEC ability indicator bit is further determined.

Specifically, in this embodiment of this disclosure, the first interface may determine, based on values of a first FEC requested indicator bit and a second FEC requested indicator bit, the FEC ability that the second interface requests to use. The first FEC requested indicator bit corresponds to the third technology ability. The value of the first FEC requested indicator bit may be used to determine whether the second interface requests to use the FEC ability corresponding to the third technology ability. The second FEC requested indicator bit corresponds to the fourth technology ability. The value of the second FEC requested indicator bit may be used to determine whether the second interface requests to use the FEC ability corresponding to the fourth technology ability. If the first interface determines that the FEC ability that the second interface requests to use is the FEC ability corresponding to the third technology ability, there is no real sense in adding the FEC ability corresponding to the fourth technology ability to an auto-negotiation page. Therefore, the first interface may determine that the FEC ability indicated by the first FEC ability indicator bit corresponds to the third technology ability. Further, because the second interface requests to use the FEC ability corresponding to the third technology ability, normally, the second interface certainly supports the FEC ability corresponding to the third technology ability. In this case, regardless of whether the value of the first FEC ability indicator bit is 0 or 1, the first interface may determine that the second interface supports the FEC ability corresponding to the third technology ability.

Case 2 is described by using an example. The FEC ability corresponding to the third technology ability is a third FEC ability. If the value of the first FEC requested indicator bit is 1, and the value of the second FEC requested indicator bit is 0, the first interface determines that the second interface supports the third FEC ability and requests to use the third FEC ability.

As described above, in this embodiment of this disclosure, the N bits may include an FEC function indicator bit sequence and a technology ability indicator bit sequence. In an embodiment of this embodiment of this disclosure, a value of N may be equal to a quantity of bits of a basic page in a current IEEE 802.3 standard, in other words, N is equal to 48. Correspondingly, in the current IEEE 802.3 standard, all of the $22^{nd}$ bit to the $37^{th}$ bit in the 48 bits are technology ability indicator bits, and specific meanings of the $22^{nd}$ bit to the $37^{th}$ bit are clearly specified. The $45^{th}$ bit to the $48^{th}$ bit in the 48 bits are FEC function indicator bits, and specific meanings of the $45^{th}$ bit to the $48^{th}$ bit are clearly specified. Meanings of the $38^{th}$ bit to the $44^{th}$ bit in the 48 bits are not specified currently.

It may be understood that, because the meanings of the $38^{th}$ bit to the $44^{th}$ bit are not determined, the $38^{th}$ bit to the $44^{th}$ bit may be used as FEC function indicator bits, or may be used as technology ability indicator bits. Therefore, in an implementation of this embodiment of this disclosure, the technology ability indicator bit sequence may be p bits in the $22^{nd}$ bit to the $44^{th}$ bit in the 48 bits, the FEC function indicator bit sequence is q bits in the $38^{th}$ bit to the $48^{th}$ bit in the 48 bits, and the p bits are different from the q bits. It can be learned that according to the solution provided in this embodiment of this disclosure, 48 bits in a basic page can carry more information, so that a process of increasing auto-negotiation pages is slowed down, thereby avoiding impact on auto-negotiation efficiency.

The foregoing describes the auto-negotiation method provided in embodiments of this disclosure. With reference to the latest IEEE 802.3 standard, the following describes the auto-negotiation method provided in embodiments of this disclosure.

In the latest IEEE 802.3 standard, meanings of the $45^{th}$ bit to the $48^{th}$ bit are specified. Details are shown in Table 1 below.

TABLE 1

| Bit | Meanings |
| --- | --- |
| 45 | 10 Gb/s per lane FEC ability |
| 46 | 10 Gb/s per lane FEC requested |
| 47 | 25G RS-FEC requested |
| 48 | 25G BASE-R FEC requested |

It can be learned from Table 1 that the $45^{th}$ bit is an FEC ability indicator bit, indicating an FEC ability corresponding to a technology ability with a communications rate of 10 Gbps; the $46^{th}$ bit is an FEC requested indicator bit, indicating an FEC ability corresponding to the technology ability with the communications rate of 10 Gbps; and both the $47^{th}$ bit and the $48^{th}$ bit are FEC requested indicator bits, indicating FEC abilities corresponding to a technology ability with a communications rate of 25 Gbps.

Scenario 1: A new technology ability, namely, the Ethernet interface type mentioned above, emerges. For ease of description, the new technology ability is referred to as a target technology ability. An FEC ability corresponding to the target technology ability is a target FEC ability. If the target technology ability is incompatible with the technology ability with the communications rate of 10 Gbps, the 45$^{th}$ bit and/or the 46$^{th}$ bit may be used as an FEC function indicator bit corresponding to the target FEC ability. For example, the 45$^{th}$ bit is used as an FEC ability indicator bit of the target FEC ability, and/or the 46$^{th}$ bit is used as an FEC requested indicator bit of the target FEC ability. If the target technology ability is incompatible with the technology ability with the communications rate of 25 Gbps, the 47$^{th}$ bit or the 48$^{th}$ bit may be used as an FEC requested indicator bit corresponding to the target FEC ability. For example, the 47$^{th}$ bit is used as the FEC requested indicator bit of the target FEC ability, or the 48$^{th}$ bit is used as the FEC requested indicator bit of the target FEC ability. Correspondingly, during auto-negotiation, a first interface may perform operation 201 and operation 202 in the foregoing embodiment to determine an operation mode supported by a second interface. Specifically, the target FEC ability may correspond to the first technology ability in the foregoing embodiment, and the technology ability with the communications rate of 10 Gbps may correspond to the second technology ability in the foregoing embodiment, or the technology ability with the communications rate of 25 Gbps may correspond to the second technology ability in the foregoing embodiment.

Scenario 2: A new technology ability, namely, a target technology ability, emerges. An FEC ability corresponding to the target technology ability is a target FEC ability. If the target technology ability is compatible with the technology ability with the communications rate of 10 Gbps, and in an actual application, a value of an FEC requested indicator bit corresponding to the target FEC ability and a value of the 46$^{th}$ bit cannot both be 1, any one of the 38$^{th}$ bit to the 44$^{th}$ bit may be determined as the FEC requested indicator bit corresponding to the target FEC ability, and the 45$^{th}$ bit is used as an FEC ability indicator bit corresponding to the target FEC ability. Correspondingly, during auto-negotiation, a first interface may perform operation 301 and operation 302 in the foregoing embodiment to determine an operation mode supported by a second interface. Specifically, the target FEC ability may correspond to the third technology ability in the foregoing embodiment, and the technology ability with the communications rate of 10 Gbps may correspond to the fourth technology ability in the foregoing embodiment.

It should be noted that although the target technology ability is described herein as an example of the new technology ability, this is merely shown for ease of understanding, and does not constitute a limitation on embodiments of this disclosure. Alternatively, the target technology ability may actually be an existing technology ability. For example, a new FEC ability corresponding to an existing technology ability emerges, in other words, the target FEC ability is the new FEC ability, and the target technology ability is the existing technology ability. In this case, the solution in embodiments of this disclosure may also be used to add the new FEC ability to a basic page. Details are not described herein.

Based on the auto-negotiation method provided in the foregoing embodiments, an embodiment of this disclosure further provides an auto-negotiation apparatus, and the apparatus is configured to perform the auto-negotiation method provided in the foregoing method embodiments. The following describes the auto-negotiation apparatus with reference to the accompanying drawings.

Figure 5:
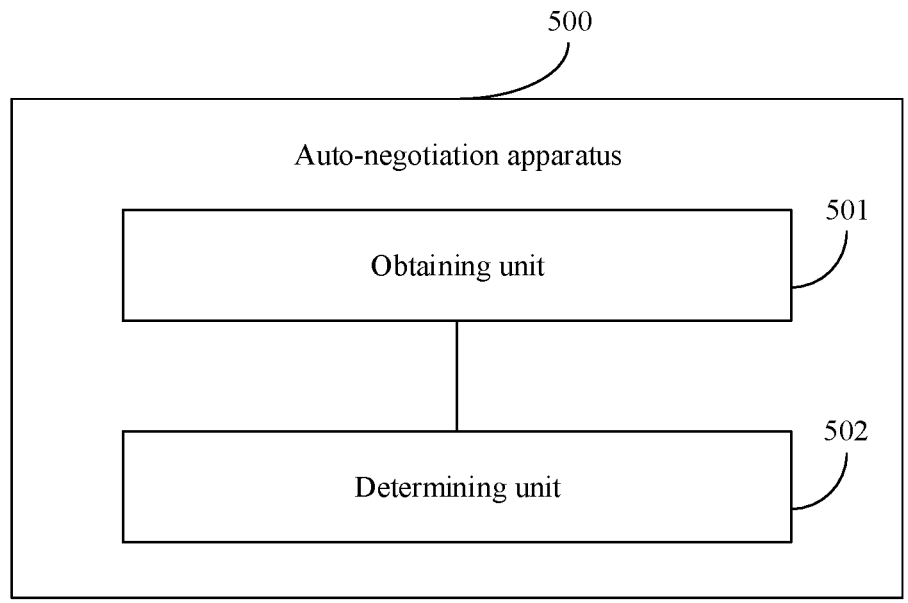
FIG. 5 is a schematic diagram of a structure of an auto-negotiation apparatus according to an embodiment of this disclosure.

FIG. 5 is a schematic diagram of a structure of an auto-negotiation apparatus according to an embodiment of this disclosure.

An auto-negotiation apparatus 500 provided in this embodiment of this disclosure may include, for example, an obtaining unit 501 and a determining unit 502.

The obtaining unit 501 is configured to obtain basic page information from a second interface, where the basic page information includes N bits, the N bits include a forward error correction FEC function indicator bit sequence, the FEC function indicator bit sequence includes an FEC ability indicator bit and an FEC requested indicator bit, and N is a positive integer greater than or equal to 2.

The determining unit 502 is configured to determine, based on values of a plurality of bits in the N bits, an operation mode supported by the second interface.

In some embodiments, the FEC function indicator bit sequence includes a first FEC function indicator bit. The first FEC function indicator bit is used to correspond to m FEC abilities, wherein m is greater than or equal to 1. When m is greater than 1, technology abilities supported by the m FEC abilities are incompatible.

In some embodiments, the FEC function indicator bit sequence includes a first FEC ability indicator bit that corresponds to n FEC abilities, wherein n is greater than or equal to 1. When n is greater than 1 and technology abilities supported by the n FEC abilities are compatible, each of then FEC abilities corresponds to one FEC requested indicator bit, and a maximum of one of the n FEC abilities is requested for use at a same moment.

In an implementation, the N bits further include a technology ability indicator bit sequence. If the first FEC function indicator bit corresponds to m FEC abilities, the determining unit 502 is configured to: determine, based on a value of a first technology ability indicator bit and a value of a second technology ability indicator bit, a technology ability supported by the second interface. The technology abilities supported by the m FEC abilities may include a first technology ability and a second technology ability. If it is determined that the second interface supports the first technology ability, the determining unit 502 is configured to determine, based on a value of the first FEC function indicator bit, an FEC ability supported by the second interface and an FEC ability that the second interface requests to use. The FEC ability supported by the second interface and the FEC ability that the second interface requests to use may correspond to the first technology ability.

In an implementation, if the first FEC ability indicator bit corresponds to n FEC abilities, the determining unit 502 includes a first determining subunit, which is configured to determine, based on a value of a third technology ability indicator bit and a value of a fourth technology ability indicator bit, a technology ability supported by the second interface. The technology abilities supported by the n FEC abilities may include a third technology ability and a fourth technology ability. The determining unit 50 may include a second determining subunit, which is configured to determine, based on the technology ability supported by the second interface and a value of the first FEC ability indicator bit, the operation mode supported by the second interface.

In an implementation, the second determining subunit is configured to determine, if it is determined that the second interface supports the third technology ability and does not support the fourth technology ability, based on the value of the first FEC ability indicator bit, an FEC ability supported by the second interface. The FEC ability supported by the second interface corresponds to the third technology ability.

In an implementation, the second determining subunit is further configured to determine, based on a value of a first FEC requested indicator bit, an FEC ability that the second interface requests to use. The first FEC requested indicator bit and the FEC ability that the second interface requests to use correspond to the third technology ability.

In an implementation, the second determining subunit is configured to determine, if it is determined that the second interface supports the third technology ability and the fourth technology ability, based on values of a first FEC requested indicator bit and a second FEC requested indicator bit, an FEC ability that the second interface requests to use. The first FEC requested indicator bit corresponds to the third technology ability, and the second FEC requested indicator bit corresponds to the fourth technology ability. In some embodiments, the second determining subunit is configured to determine, if it is determined that the FEC ability that the second interface requests to use is an FEC ability corresponding to the third technology ability, based on the value of the first FEC ability indicator bit, an FEC ability supported by the second interface. The FEC ability supported by the second interface corresponds to the third technology ability.

In an implementation, N is equal to 48, the technology ability indicator bit sequence is p bits in the $22^{nd}$ bit to the $44^{th}$ bit in the 48 bits, the FEC function indicator bit sequence is q bits in the $38^{th}$ bit to the $48^{th}$ bit in the 48 bits, and the p bits are different from the q bits.

In an implementation, the second interface is located on a router or a switch.

Because the apparatus 500 is an apparatus corresponding to the auto-negotiation method provided in the foregoing method embodiments, a specific implementation of each unit of the apparatus 500 has a same concept as that in the foregoing method embodiments. Therefore, for the specific implementation of each unit of the apparatus 500, refer to related descriptions of the foregoing method embodiments. Details are not described herein again.

An embodiment of this disclosure further provides an auto-negotiation apparatus. The auto-negotiation apparatus includes a processor and a memory. The memory is configured to store a program, and the processor is configured to execute the program in the memory to perform the auto-negotiation method provided in the foregoing method embodiments, for example, perform the method operations shown in FIG. 2 to FIG. 4.

In some embodiments, the auto-negotiation apparatus may be located on an Ethernet interface, for example, the Ethernet interface 110 or 210 in FIG. 1, or the auto-negotiation apparatus may be located on a relay chip.

In some embodiments, the Ethernet interface may be located on a switch, a router, a server, a storage device, or a personal computer.

In some embodiments, the relay chip may be located on a server, a storage device, or a network device.

Figure 6:
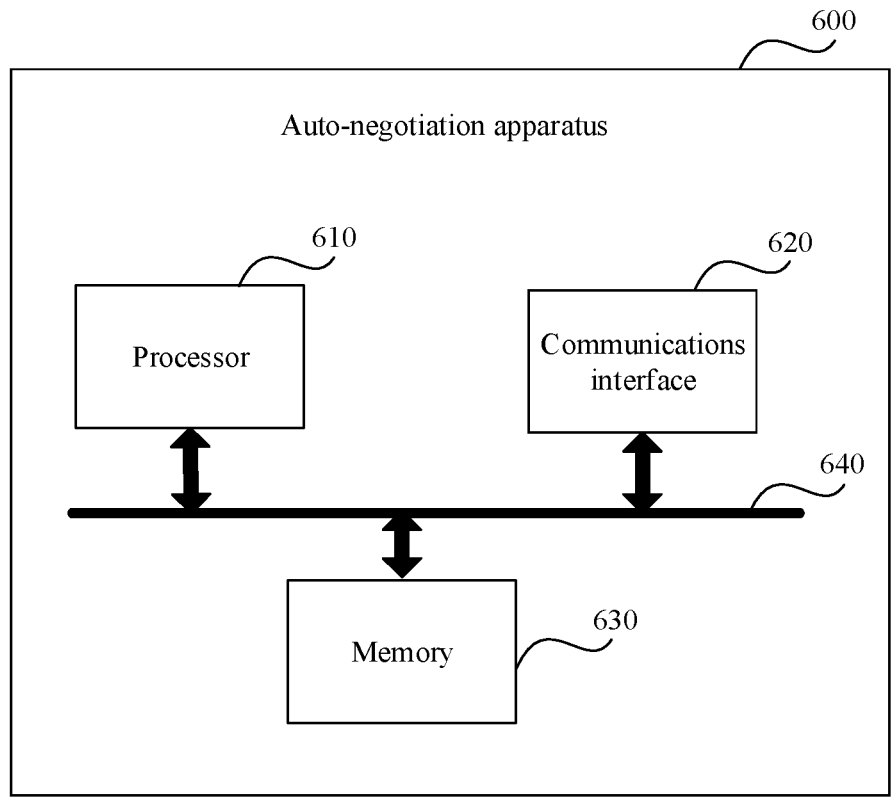
FIG. 6 is a schematic diagram of a structure of an auto-negotiation apparatus according to an embodiment of this disclosure.

It should be noted that a hardware structure of the auto-negotiation apparatus mentioned above may be a structure shown in FIG. 6. FIG. 6 is a schematic diagram of a structure of an auto-negotiation apparatus according to an embodiment of this disclosure.

As shown in FIG. 6, an auto-negotiation apparatus 600 includes a processor 610, a communications interface 620, and a memory 630. There may be one or more processors 610 in the auto-negotiation apparatus 600. In FIG. 6, one processor is used as an example. In this embodiment of this disclosure, the processor 610, the communications interface 620, and the memory 630 may be connected by using a bus system or in another manner. In FIG. 6, for example, a bus system 640 is used for connection.

The processor 610 may be a central processing unit (CPU), a network processor (NP), or a combination of a CPU and an NP. The processor 610 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 630 may include a volatile memory, for example, a random access memory (RAM). The memory 630 may also include a non-volatile memory, for example, a flash memory, a hard disk drive (HDD), or a solid-state drive (SSD). The memory 630 may further include a combination of the foregoing types of memories. The memory 630 may store, for example, basic page information coming from a second interface.

Optionally, the memory 630 stores an operating system and a program, an executable module, or a data structure, a subset thereof, or an extended set thereof. The program may include various operation instructions for implementing various operations. The operating system may include various system programs, to implement various basic services and process hardware-based tasks. The processor 610 may read the program in the memory 630 to implement the auto-negotiation method provided in embodiments of this disclosure.

The bus system 640 may be a peripheral component interconnect (PCI) bus, an extended industry standard architecture (EISA) bus, or the like. The bus system 640 may be classified into an address bus, a data bus, a control bus, and the like. For ease of representation, a thick line is used to represent the bus in FIG. 6, but this does not mean that there is only one bus or only one type of bus.

The relay chip mentioned in this disclosure may be a clock and data recovery (CDR) chip or a retimer chip, or may be another relay chip.

An embodiment of this disclosure further provides a computer-readable storage medium, including a program. When the program is run on a computer, the computer performs the auto-negotiation method provided in the foregoing embodiments.

An embodiment of this disclosure further provides a computer program product including a program. When the computer program product runs on a computer, the computer performs the auto-negotiation method provided in the foregoing embodiments.

In this disclosure, terms such as "first," "second," "third," and "fourth" (if exists) in the specification, the claims, and the accompanying drawings are intended to distinguish between similar objects but do not necessarily indicate a specific order or sequence. It should be understood that the data used in such a way are interchangeable in proper cases, so that embodiments described herein can be implemented in an order except the order illustrated or described herein. In addition, terms such as "include," "have," and any variations thereof are intended to cover non-exclusive inclusions, for example, a process, method, system, product, or device that includes a series of operations or units is not necessarily limited to those clearly listed operations or units, but may include other operations or units that are not clearly listed or inherent to such a process, method, product, or device.

It may be clearly understood by persons skilled in the art that, for purpose of convenient and brief descriptions, for a detailed working process of the foregoing system, apparatus, and unit, refer to a corresponding process in the foregoing method embodiments. Details are not described herein again.

In the several embodiments provided in this disclosure, it should be understood that the disclosed systems, apparatuses, and methods may be implemented in other manners. For example, the described apparatus embodiment is merely an example. For example, division into the units is merely logical service division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of the solutions of embodiments.

In addition, service units in embodiments of this disclosure may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in a form of a software product. The computer software product is stored in a storage medium and includes several programs for instructing a computer device (which may be a personal computer, a server, a network device, or the like) to perform all or some of the operations of the methods described in embodiments of this disclosure. The foregoing storage medium includes any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, the services described in the present application may be implemented by using hardware, software, firmware, or any combination thereof. When the present application is implemented by software, the services may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present application have been further described in detail in the foregoing specific implementations. It should be understood that the foregoing descriptions are merely specific implementations of the present application.

The foregoing embodiments are merely intended for describing the technical solutions of this disclosure instead of limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. A method, comprising:
obtaining, by a first interface, basic page information from a second interface, wherein the basic page information comprises N bits, the N bits comprise a forward error correction (FEC) function indicator bit sequence, the FEC function indicator bit sequence comprises an FEC ability indicator bit and an FEC requested indicator bit, and N is a positive integer greater than or equal to 2; and
determining, by the first interface based on values of a plurality of bits in the N bits, an operation mode supported by the second interface.

2. The method according to claim 1, wherein the FEC function indicator bit sequence comprises a first FEC function indicator bit, the first FEC function indicator bit is used to correspond to m FEC abilities, and m is greater than or equal to 1; and when m is greater than 1, technology abilities supported by the m FEC abilities are incompatible.

3. The method according to claim 2, wherein the N bits further comprise a technology ability indicator bit sequence, the determining an operation mode supported by the second interface, comprises:
determining, by the first interface based on a value of a first technology ability indicator bit and a value of a second technology ability indicator bit, a technology ability supported by the second interface, wherein the technology abilities supported by the m FEC abilities comprise a first technology ability and a second technology ability; and
wherein the second interface supports the first technology ability, determining, by the first interface based on a value of the first FEC function indicator bit, an FEC ability supported by the second interface and an FEC ability that the second interface requests to use, wherein the FEC ability supported by the second interface and the FEC ability that the second interface requests to use correspond to the first technology ability.

4. The method according to claim 3, wherein
N is equal to 48, the technology ability indicator bit sequence is p bits in the $22^{nd}$ bit to the $44^{th}$ bit in the 48 bits, the FEC function indicator bit sequence is q bits in the $38^{th}$ bit to the $48^{th}$ bit in the 48 bits, and the p bits are different from the q bits.

5. The method according to claim 1, where the FEC function indicator bit sequence comprises a first FEC ability indicator bit, the first FEC ability indicator bit corresponds to n FEC abilities, and n is greater than or equal to 1; and when n is greater than 1 and technology abilities supported by the n FEC abilities are compatible, each of the n FEC abilities corresponds to one FEC requested indicator bit, and a maximum of one of the n FEC abilities is requested for use at a same moment.

6. The method according to claim 5, wherein the determining an operation mode supported by the second interface, comprises:

determining, by the first interface based on a value of a third technology ability indicator bit and a value of a fourth technology ability indicator bit, a technology ability supported by the second interface, wherein the technology abilities supported by the n FEC abilities comprise a third technology ability and a fourth technology ability; and determining, by the first interface based on the technology ability supported by the second interface and a value of the first FEC ability indicator bit, the operation mode supported by the second interface.

7. The method according to claim 6, wherein the determining the operation mode supported by the second interface, comprises:

the second interface supports the third technology ability and does not support the fourth technology ability, determining, by the first interface based on the value of the first FEC ability indicator bit, an FEC ability supported by the second interface, wherein the FEC ability supported by the second interface corresponds to the third technology ability.

8. The method according to claim 7, further comprising:

determining, by the first interface based on a value of a first FEC requested indicator bit, an FEC ability that the second interface requests to use, wherein the first FEC requested indicator bit and the FEC ability that the second interface requests to use correspond to the third technology ability.

9. The method according to claim 6, wherein the determining the operation mode supported by the second interface, comprises one or more of:

(a) determining, by the first interface based on values of a first FEC requested indicator bit and a second FEC requested indicator bit, an FEC ability that the second interface requests to use, wherein the first FEC requested indicator bit corresponds to the third technology ability, and the second FEC requested indicator bit corresponds to the fourth technology ability; or (b) determining, by the first interface based on the value of the first FEC ability indicator bit, an FEC ability supported by the second interface, wherein the FEC ability supported by the second interface corresponds to the third technology ability.

10. The method according to claim 1, wherein the first interface is located on an Ethernet interface or a relay chip.

11. The method according to claim 10, wherein the Ethernet interface is located on one of: a switch, a router, a server, a storage device, and a personal computer.

12. The method according to claim 10, wherein the relay chip is located on one of: a server, a storage device, and a network device.

13. An apparatus, comprising:

a processor configured to execute a program to perform operations, the operations comprising:

obtaining basic page information from a second interface, wherein the basic page information comprises N bits, the N bits comprise a forward error correction (FEC) function indicator bit sequence, the FEC function indicator bit sequence comprises an FEC ability indicator bit and an FEC requested indicator bit, and N is a positive integer greater than or equal to 2; and determining, based on values of a plurality of bits in the N bits, an operation mode supported by the second interface.

14. The apparatus according to claim 13, wherein the FEC function indicator bit sequence comprises a first FEC function indicator bit, the first FEC function indicator bit is used to correspond to m FEC abilities, and m is greater than or equal to 1; and when m is greater than 1, technology abilities supported by the m FEC abilities are incompatible.

15. The apparatus according to claim 14, wherein the N bits further comprise a technology ability indicator bit sequence, the determining an operation mode supported by the second interface, comprises:

determining, based on a value of a first technology ability indicator bit and a value of a second technology ability indicator bit, a technology ability supported by the second interface, wherein the technology abilities supported by the m FEC abilities comprise a first technology ability and a second technology ability; and wherein the second interface supports the first technology ability, determining, by the first interface based on a value of the first FEC function indicator bit, an FEC ability supported by the second interface and an FEC ability that the second interface requests to use, wherein the FEC ability supported by the second interface and the FEC ability that the second interface requests to use correspond to the first technology ability.

16. The apparatus according to claim 13, wherein the FEC function indicator bit sequence comprises a first FEC ability indicator bit, the first FEC ability indicator bit corresponds to n FEC abilities, and n is greater than or equal to 1; and when n is greater than 1 and technology abilities supported by the n FEC abilities are compatible, each of the n FEC abilities corresponds to one FEC requested indicator bit, and a maximum of one of the n FEC abilities is requested for use at a same moment.

17. The apparatus according to claim 16, wherein the determining an operation mode supported by the second interface, comprises:

determining, based on a value of a third technology ability indicator bit and a value of a fourth technology ability indicator bit, a technology ability supported by the second interface, wherein the technology abilities supported by the n FEC abilities comprise a third technology ability and a fourth technology ability; and determining, by the first interface based on the technology ability supported by the second interface and a value of the first FEC ability indicator bit, the operation mode supported by the second interface.

18. The apparatus according to claim 13, wherein the apparatus is located on one of: an Ethernet interface and a relay chip.

19. The apparatus according to claim 18, wherein the Ethernet interface is located on one of: a switch, a router, a server, a storage device, and a personal computer.

20. A non-transitory computer-readable storage medium having instructions stored thereon that, when executed by a processing device, cause the processing device to:

obtain basic page information from a second interface, wherein the basic page information comprises N bits, the N bits comprise a forward error correction (FEC) function indicator bit sequence, the FEC function indicator bit sequence comprises an FEC ability indicator bit and an FEC requested indicator bit, and N is a positive integer greater than or equal to 2; and determine, based on values of a plurality of bits in the N bits, an operation mode supported by the second interface.

* * * * *